March 25, 1952  J. FRANKS  2,590,394
FLAT TIRE INDICATOR
Filed June 11, 1949
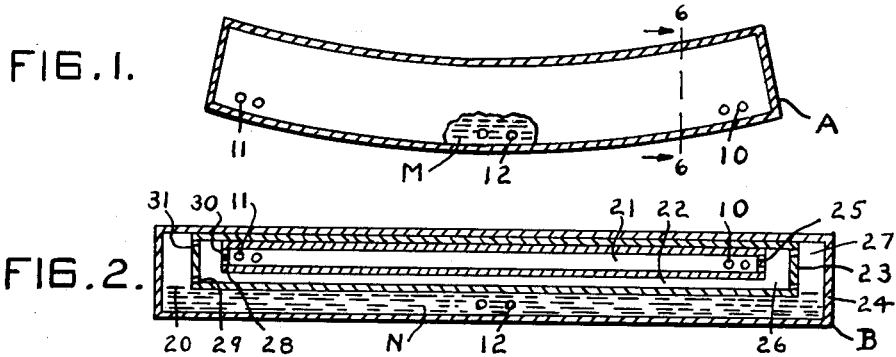
FIG.1.
FIG.2.
FIG.3.
FIG.4.
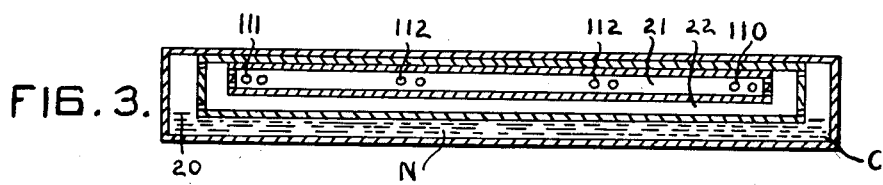
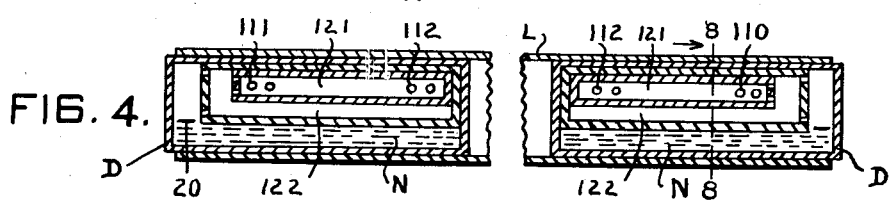
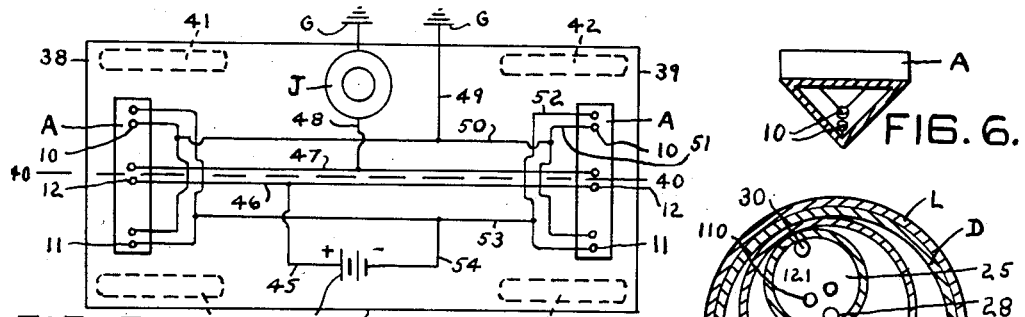
FIG.5.
FIG.6.
FIG.8.
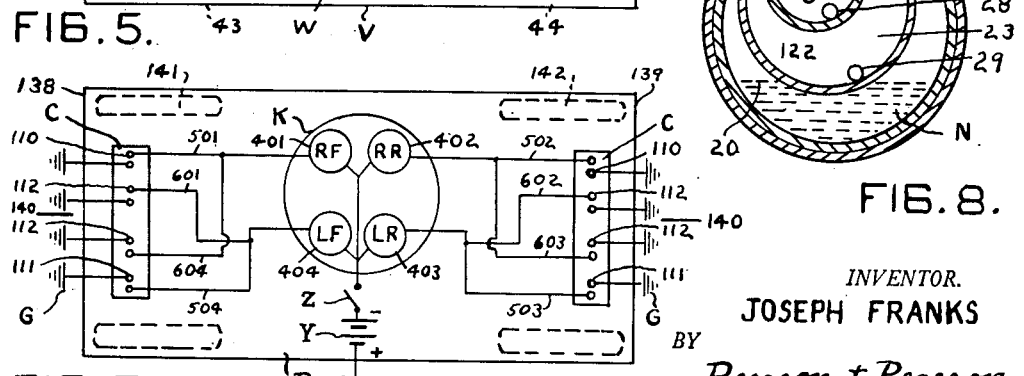
FIG.7.
INVENTOR.
JOSEPH FRANKS
BY
Pearson + Pearson
attorneys Patented Mar. 25, 1952

2,590,394

UNITED STATES PATENT OFFICE 2,590,394

FLAT TIRE INDICATOR

Joseph Franks, Lawrence, Mass.; Maurice Young, Boston, Mass., executor of said Joseph Franks, deceased, assignor to said Maurice Young, as trustee Application June 11, 1949, Serial No. 98,425

5 Claims. (Cl. 200—52)

This invention relates to an improved gravity actuated switch for use in association with the tires of a motor vehicle to indicate a reduction of air pressure in the tires. It relates particularly to gravity actuated switches of the type having a tube, containing an electric-conducting liquid, and positioned transversely of the vehicle at the front and at the rear thereof.

The object of my invention is to close an electric circuit to an indicator on the dashboard when the electric conducting liquid flows to one end of one tube thus signalling a deflated tire.

A further object of my invention is to avoid giving the indication of a deflated tire when both the forward and the rear tubular switches are canted to the same side of the vehicle as might occur on a crowned highway.

A still further object of my invention is to so compartmentalize the tubular switch that instead of using a small quantity of expensive mercury, a larger quantity of a less expensive liquid can be used without undue splashing or false indication due to centrifugal force.

In the drawings, Fig. 1 is an elevation in section of the preferred form of my switch.

Fig. 2 is a view similar to Fig. 1 of a modification.

Fig. 3 is a view similar to Fig. 1 of another modification.

Fig. 4 is a view similar to Fig. 1 of still another modification.

Fig. 5 is an electrical diagram of the devices shown in Figs. 1 and 2.

Fig. 6 is a cross section on line 6—6 of Fig. 1.

Fig. 7 is an electrical diagram of the devices shown in Figs. 3 and 4.

Fig. 8 is a cross section on line 8—8 of Fig. 4.

In Fig. 1, I show one form of my liquid operated switch which consists of a curved hollow tube A, preferably hermetically sealed and preferably of V-shaped cross section as shown in Fig. 6. A pair of electric contacts 10 and a pair of electric contacts 11 is provided near the outer ends of each tube A and a small quantity of an electric conducting liquid, such as mercury M is free to flow to either end of the tube as the tube becomes canted. I call each pair of contacts 10 and 11 an outerpair of electric contacts and each is included in the electric circuit to an electric indicator J as shown in Fig. 5. In addition I provide what I call an inner pair of electric contacts 12, at the bottom centre of tube A which are also included in the electric circuit to the electric indicator J. The curvature of tube A helps to prevent the mercury M from flowing to the end of the tube under the influence of centrifugal force as the automobile rounds a corner and the V-shape of the cross section permits the use of a less amount of mercury M.

As shown in Fig. 2, instead of mercury M, I may use a less expensive liquid in considerably larger quantities, such as N, which fills the lower portion of a tube B and has a level surface to a height such as 29. The liquid N may be a non-freezing, electric conducting mixture of about one part potassium, four parts of common salt, twenty parts of alcohol and seventy-five parts of water which I find satisfactory for the purpose. Outer electric contacts 10 and 11 are provided in tube B as in tube A, and are located near the outer end of the smaller and higher container 21 of a plurality of nested containers such as 21 and 22 within tube B. The end wall 23 of container 22 is spaced apart from end wall 24 of tube B and end wall 25 of container 21 is spaced apart from end wall 23 of 22 to form an end chamber at 26 and 27. Small apertures 28 and 29 are provided in the bottom centre of walls 23 and 25 for the seepage of liquid N into containers 21 and 22 and suitable air holes 30 and 31 are also provided in the upper part of walls 23 and 25. Inner electric contacts 12, as in tube A, are located in the lower central portion of tube B so that they are in contact with the electric conducting liquid N when the tube B is in a horizontal position.

As shown in Fig. 5, a tube such as A or B is mounted transversely at the front 38 and rear 39 of a vehicle V, the vehicle having a longitudinal axis, 40, 40. Vehicle V has four tires 41, 42, 43, and 44, a battery W, ground G and an electric indicator J preferably consisting of a visual signal by an electric bulb. It will be seen from the electric diagram of Fig. 5 that when both the front and rear inner contacts 12, 12 are submerged in mercury as when the vehicle is level, no complete circuit to the indicator J is made because the contacts 10 and 11 are open. No complete circuit to the indicator J is made when both front and rear contacts 10, 10 are submerged in mercury due to the lowering of that entire side of the vehicle nor when both front and rear contacts 11, 11 are so submerged. Similarly no complete circuit is made when the two front wheels 41 and 43 or two rear wheels 42 and 44 are on a different horizontal plane.

However, when one tire such as 42 becomes deflated, a circuit is completed from the battery W through wire 45, wire 46, inner contacts 12 in the tube A at 38, wire 47, wire 48, indicator J, ground G, wires 49, 50 and 51, outer contact 10 of the tube A at 39, wires 52, 53, and 54 and back to battery W, thus lighting the bulb of indicator J and warning the driver of a deflated tire.

Instead of locating my inner electrical contacts such as 12 so that they will be submerged in the liquid when the vehicle is level, I may locate them in a higher position as shown at 112 in Fig. 3, with one set on each side of the tube. I provide a pair of outer electric contacts 110 and 111, similar to 10 and 11, in Figs. 1 and 2, and it should be noted that an inner pair of contacts 112 is not reached by the liquid until after the tube such as C has been canted sufficiently to cover the adjacent pair of outer electric contacts such as 110 or 111.

As shown in Fig. 7, I may use an electric indicator K, having four bulbs 401, 402, 403 and 404, each appropriately marked to indicate a particular wheel as shown. There are four electric circuits 501, 502, 503, and 504 each including an outer pair of electric contacts 110 or 111, a bulb such as 401, 402, 403, or 404, and each including the battery Y and a switch Z. As indicated in Fig. 7, when the vehicle P, having a longitudinal axis 140, 140, is completely level, no circuit is completed to the indicator because the liquid does not contact either the inner or outer pairs of electric contacts 110, 112, or 111 in tube C, the contacts all being above the level of the liquid.

If one wheel 142 of a vehicle P becomes deflated, however, the tube C will become canted in that direction. Liquid N will seep into container 22 through aperture 29 and into container 21 through aperture 28 and reach outer contact points 110. Circuit 502 will thus be completed from battery Y, through bulb 402, contact 110 and ground G, thus illuminating the bulb 402 and warning the operator. If vehicle P is travelling on a crowned highway so that tires 141 at front 138 and 142 at rear 139 are both on a lower plane than the tires on the other side of the vehicle, circuit 501 and 502 will both be completed.

During such travel, if tire 142 becomes deflated, liquid N will rise further into container 22 of the tube C at the rear 139 and reach the adjacent inner pair of contacts 112. A circuit 602 is thus completed from battery Y through switch Z, bulb 402, the adjacent inner pair of contacts 112 and ground G whereby bulb 403 becomes illuminated in addition to bulbs 401 and 402, thus warning the driver that while one entire side of the vehicle is lower than the other side, a tire on that side is also deflated. The operation of circuits 501, 601, 504, 604, and 503, 603, is similar to that explained above.

As shown in Figs. 2 and 3, my compartmented tube may be in one piece as at B and C, or as shown in Fig. 4, a tubular housing L may be provided having a separate tube D held within each end. Tube D may be revoluble in housing L in order to permit the raising of the height of the aperture 5 for adjusting the rapidity of reaction of the device as indicated in Fig. 8.

In Fig. 8, a cross section of container L and tube D is shown, with tube D, slightly revolved within housing L to raise the height of apertures 29, and 28, thus requiring a greater cant in tube D before the electric contacts will be reached by liquid N. The inner container of D is 121 and the next larger container is 122, and the apertures 28, 29, 30, and 31 and end walls 23 and 25 are of the same construction as in B and C.

It will be apparent that the graduated series of elongated containers such as 21 and 22 within a tube such as B is advantageous in preventing a false indication due to centrifugal force. Upon rounding a curve, liquid N may tend to flow into an end chamber 27 and fill the same but in order to enter container 22 it must reverse its direction against the influence of centrifugal force.

I claim:

1. In a liquid operated electric switch, an elongated tubular outer container having closed ends; an electric conducting liquid filling the lower portion of said container to a predetermined level; an elongated tubular inner container of less diameter and less length than said outer container, having closed ends, each with a small liquid aperture at the bottom and a small aperture at the top thereof, said inner container being mounted, above the level of the liquid, in the upper portion of said outer container to form end chambers in opposite ends of said outer container and a pair of electric contacts, located in the inner container, arranged to complete an electric circuit through said switch when in contact with said liquid.

2. In a liquid operated electric switch, an elongated tubular outer container having closed ends; an electric conducting liquid filling the lower portion of said container to a predetermined level; and elongated tubular inner container of less diameter and less length than said outer container, having closed ends, each with a small liquid aperture at the bottom and a small aperture at the top thereof, said inner container being mounted, above the level of the liquid, in the upper portion of said outer container to form end chambers in opposite ends of said outer container; a pair of outer electric contacts located near the ends within said inner container; a pair of inner electric contacts located near the centre within said inner container, said inner and outer contacts being arranged to complete circuits through said switch when in contact with said liquid.

3. A liquid operated electric switch for use as a tilt indicator on an automobile and comprising a graduated series of elongated horizontally positioned containers within an outer hermetically sealed container, each inner container mounted within the upper portion of the one next larger with its opposite ends spaced from the ends of the next larger container to form an end chamber therein and each end having liquid apertures therein; an electric conducting liquid filling the lower portion of said outer container up to the bottom of the adjacent inner container; and electric contacts in the smallest uppermost inner container adapted to close an electric circuit through said switch when contacted by said liquid.

4. A liquid operated electric switch for use as a tilt indicator on an automobile and comprising a graduated series of elongated, horizontally positioned containers within an outer, hermetically sealed container, each inner container mounted within the upper portion of the one next larger with its opposite ends spaced from the ends of the next larger container to form an end chamber therein and each having liquid apertures therein; an electric-conducting liquid filling the lower portion of said outer container up to the bottom of the adjacent inner container; two pairs of outer electric contacts, each pair located at an opposite end of the smallest uppermost inner container and each pair adapted to complete an electric circuit through said switch when contacted by said liquid and a pair of inner, electric contacts, located between said two outer pairs in one of said containers, and adapted to complete another electric circuit through said switch when contacted by said liquid.

5. A liquid operated electric switch for use as a tilt indicator on an automobile and comprising an elongated tubular container; an electric conducting liquid in the lower portion of said container; a pair of electric contacts in the central lower portion of said container beneath the level of said liquid; a pair of electric contacts at each opposite end of said container above the level of said liquid and compartmental means adjustably positioned within said container for regulating the flow of liquid between said pairs of contacts.

JOSEPH FRANKS.

REFERENCES CITED

The following references are of record in the file of this patent:

UNITED STATES PATENTS

| Number | Name | Date |
| --- | --- | --- |
| 1,415,820 | Eynon | May 9, 1922 |
| 1,560,118 | Stoekle | Nov. 3, 1925 |
| 1,820,300 | Cramblet | Aug. 25, 1931 |
| 1,982,717 | Wilhelm | Dec. 4, 1934 |
| 2,155,865 | Leavenworth et al. | Apr. 25, 1939 |
| 2,202,987 | Egenas | June 4, 1940 |

FOREIGN PATENTS

| Number | Country | Date |
| --- | --- | --- |
| 11,368 | Great Britain | of 1904 |